Oct. 11, 1932.  O. JASSOY  1,881,623
CHEESE SLICER
Filed Feb. 27, 1931
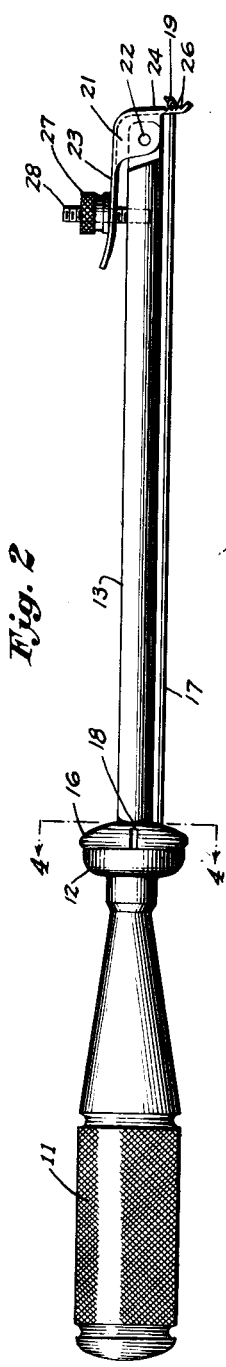
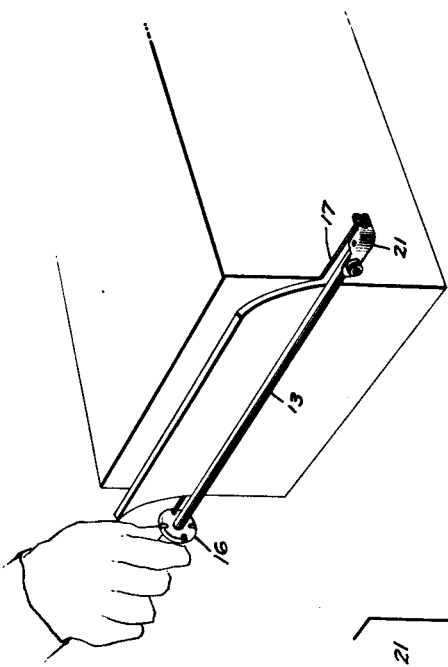
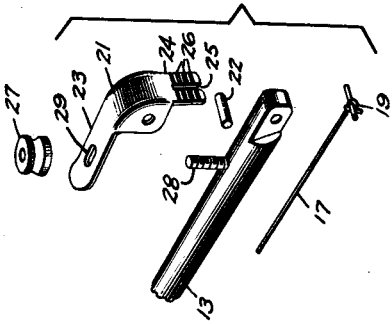
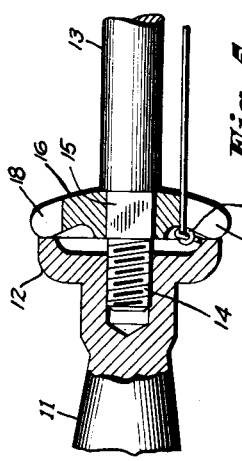
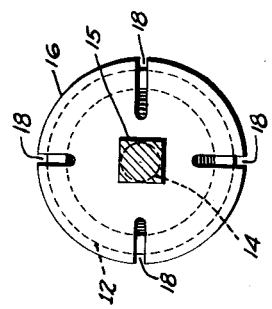
Inventor
Otto Jassoy
By Barton A. Bean Jr.
Attorney Patented Oct. 11, 1932

1,881,623

UNITED STATES PATENT OFFICE

OTTO JASSOY, OF BUFFALO, NEW YORK, ASSIGNOR TO EINAR C. CHRISTENSEN, OF BUFFALO, NEW YORK

CHEESE SLICER

Application filed February 27, 1931. Serial No. 518,830.

This invention relates to devices for slicing cheese, butter, and other materials of like consistency. More particularly it relates to devices for such use which are relatively small and compact and are particularly adapted for home use along with such articles as table silverware or kitchen utensils.

The invention comprehends a device of the general appearance of a carving knife and having a handle and a shaft extending therefrom which supports in parallelism therewith a cutting member, in order that during the slicing operation the shaft may be held against the face of the material being sliced to gauge the thickness of slice and effect the cutting of a slice of even thickness corresponding to the distance between the shaft and the cutting member. Means are contemplated whereby this distance may be conveniently varied to produce slices of the desired thickness.

The invention further comprehends a device which may be quickly and easily disassembled and assembled for cleaning or replacing its various component parts. A novel device is incorporated in the construction for adjusting the cutting member to the proper tension, this member preferably comprising wire or a thin blade of other section so that the sliced material will be deformed as little as possible during the slicing operation.

These and other objects and advantages will become apparent from the following description of a typical embodiment of the invention, reference being made to the accompanying drawing, wherein:—

Fig. 1 is a perspective view showing the device in operation;

Fig. 2 is a plan view of the complete device;
Fig. 3 is an exploded view showing the parts, which comprise the cutting wire tensioning end of the device, in disassembled relation;

Fig. 4 is a transverse sectional view taken along line 4—4 of Fig. 2, showing an annular member which is adapted to secure the inner end of the cutting wire; and Fig. 5 is a longitudinal sectional view of the portions shown in Fig. 4 and illustrating one mode of assembling the handle, shaft, cutting wire and the wire securing annular member.

As shown in Fig. 2 the device may comprise a handle 11, which may be of any desired pattern and may simulate or harmonize in form and contour with table silverware or kitchen ware. The handle may have an enlargement 12 at one end thereof and may serve to support an elongated shaft 13 which is preferably co-axial therewith and has a threaded end 14 threaded into the handle. A non-circular shank portion 15 may be formed on the shaft 13, between the main body thereof and the threaded end 14, the portion 15 being of length corresponding to that of the annular wire securing member 16, the bore of the latter being preferably formed to interfit with the portion 15 in a plurality of different angular relationships.

A cutting wire 17, corresponding in length to the shaft, parallels the latter, and engages, at its inner end, the annular member. The latter may be provided with a plurality of slots 18 extending inwardly from its periphery, the slots being graduated in length as shown in Fig. 4. The wire 17 has retaining knobs 19 at its ends, and one of the latter may be fitted into any desired one of the slots 18, the contour of the member 16 causing the wire, upon being tensioned, to be retained adjacent the inner end of the slot, and the enlarged end 12 of the handle, by abutting the annular securing member, preventing displacement of the end of the wire.

Mounted upon the outer end of the shaft 13 is a tensioning lever 21, which is pivotally secured to the shaft by a pin 22. The lever has a long arm 23, extending substantially parallel to the shaft, and a short arm 24 extending substantially transversely of the shaft. The short arm has an end slot 25 for receiving the outer end of the cutting wire and a plurality of parallel deformations 26, any one of which may serve to engage the knob 19 at the outer end of the wire to retain the latter a predetermined distance from the longitudinal axis of the shaft. It is preferred that the deformations be spaced distances from the extended longitudinal axis of the shaft which are equal to the distances between the axis and the respective inner ends of the slots 18.

The wire 17, secured at one end by the member 16 and at the opposite end by the arm 24, may be tensioned to any desired degree by movement of arm 24, about the pivot pin, toward the shaft 13. This may be accomplished by turning the knurled adjusting nut 27, which is threaded upon the screw 28. The latter may be affixed to the shaft 13 and preferably extends through an aperture 29 in the lever arm 23.

In use the device may be operated to slice cheese, butter, ice cream, or the like by holding it in the manner indicated in Fig. 1 and moving it downwardly and intersectingly through the material to be sliced. The shaft 13, which is preferably rounded, may engage the outer surface of the material and thus serve to gauge the thickness of the slice, which will be determined by the distance between the cutting wire and the shaft.

This distance may be readily varied by removing the handle from the shaft and moving the annular securing member through an angle about the axis of the shaft to bring the slot 18 having the desired depth into the plane of the slot 25. One end of the cutting wire may then be entered into this slot 18, the handle replaced, and the opposite end of the cutting wire entered into engagement with the desired deformation 26 of the adjusting lever. The latter may then be actuated by the knurled nut 27 to properly tension the wire for cutting. In this manner the cutting wire may be moved to any one of a multiplicity of positions relative to the shaft in order to adapt the device to cut slices of varying thickness.

It will now be understood that this invention provides a simple and easily operated device, capable of economical manufacture, and adapted to effect regular and even slices of varying thicknesses. The tensioning means and the removable handle enable the device to be quickly and easily disassembled and assembled, in order that the parts may be thoroughly cleaned or replaced.

It will be further understood that the device illustrated is merely exemplary of the principles of the invention, which, it is intended, shall be considered to be of scope commensurate with the appended claims.

What is claimed is:

1. In a cheese slicer, a handle, a shaft, a cutting member substantially parallel to the shaft, a member for securing said cutting member adjacent one end of said shaft, and means for attaching said cutting member adjacent the other end of said shaft, said member for securing said cutting member having a plurality of means about its periphery for engaging said cutting member and being adapted to be positioned in such various positions relative to said shaft as to bring any one of said plurality of means into alignment with said first mentioned means.

2. In a cheese slicer having a handle and a shaft, a retaining member adapted to be secured in any one of a number of angular positions relative to said shaft adjacent one end of said shaft, tensioning means at the opposite end of said shaft, and a cutting member and means for securing it to said tensioning means, said retaining member having a plurality of means about the periphery thereof for retaining an end of said cutting member, certain of said plurality of means being spaced a different distance than other of said plurality of means from the axis of said shaft, whereby the cutting member may be spaced various distances from the shaft by moving the retaining member to bring various of the retaining means thereof into alignment with said tensioning means and by securing the cutting member thereto.

3. In a cheese slicer having a shaft, a retaining member removably fitted to one end of said shaft, said retaining member having a plurality of angularly disposed slots about its periphery, a tensioning member mounted at the opposite end of said shaft, and a cutter engaged and retained in one of the slots in said retaining member and secured to said tensioning member, one of said members and said shaft being formed to interengage in a plurality of angular positions about the axis of said shaft, whereby said tensioning member and any one of the slots of said retaining member may be brought into alignment for supporting the cutter substantially parallel to the axis of said shaft.

4. In a cheese slicer, a handle, a shaft, a cutting member substantially parallel to the shaft, means adjacent one end of the shaft for securing one end of the cutting member, tensioning means adjacent the other end of the shaft for securing the other end of the cutting member, said tensioning means comprising a lever pivoted to the shaft and adapted to engage the cutting member, and screw threaded means for effecting relative angular movement between said shaft and lever.

5. In a cheese slicer having a handle and a shaft, a cutting member substantially parallel to the shaft, means for securing said cutting member adjacent one end of the shaft, tensioning means for securing the cutting member adjacent the other end of the shaft, said tensioning means comprising a lever pivoted to said shaft about an axis transverse of the axis of said shaft, said lever having a slot for receiving an end of said cutting member, and screw threaded means for effecting relative angular movement between said lever and shaft about the pivotal axis.

6. In a cheese slicer having a shaft and a cutting member substantially paralleling said shaft, means at one end of said shaft for securing the cutting member, tensioning means at the opposite end of said shaft for securing the cutting member, said tensioning means comprising a lever pivoted to said shaft and having an arm extending in substantial parallelism to said shaft and an arm extending substantially transverse of said shaft, means on the latter arm for engaging the cutting member, and screw threaded means associated with said shaft and extending through said first mentioned arm for adjusting the relative angular position of said shaft and lever.

7. In a cheese slicer having a shaft and a cutting member substantially paralleling said shaft, means at one end of said shaft for securing an end of the cutter at any one of a number of distances from the axis of the shaft, tensioning means at the opposite end of said shaft for securing an end of the cutter member, said cutter member being provided with an enlargement at the last mentioned end thereof, and said tensioning means comprising a lever pivoted to said shaft, said lever having a slot therein for receiving the end of the cutter member and a plurality of deformations disposed at various distances from the axis of said shaft, any one of said deformations being adapted to seat the enlargement on the cutting member.

8. In a cheese slicer having a shaft provided with a non-circular end, a retaining member adapted to engage the non-circular end in any one of a number of angular relationships about the axis of said shaft, said retaining member having a plurality of slots of varying depths formed about the periphery thereof, a tensioning member comprising a lever pivoted to said shaft and having a slot in one end thereof and a plurality of deformations disposed at various distances from the axis of said shaft, and a cutter member having enlargements at the ends thereof and extending substantially parallel to said shaft, the ends of said cutter member being receivable in the slot in the lever and in a slot of the retaining member that is in alignment with said lever, the enlargement on one end of said cutter member being adapted to engage one of the deformations on said lever.

9. In a cheese slicer, a shaft, a cutting member substantially parallel to the shaft, means for securing the cutting member adjacent each end of said shaft, the means at one end of the shaft comprising a part extending radially from the shaft, said part having a plurality of recesses spaced about the periphery thereof for selectively receiving said cutting member, said recesses being spaced various distances from the axis of said shaft.

OTTO JASSOY.